US012688835B2

(12) United States Patent
Han et al.

(10) Patent No.: US 12,688,835 B2
(45) Date of Patent: Jul. 21, 2026

(54) DRIVING CIRCUIT, BACKLIGHT MODULE AND DRIVING METHOD THEREFOR, AND DISPLAY APPARATUS

(71) Applicant: BOE Technology Group Co., Ltd., Beijing (CN)

(72) Inventors: Nan Han, Beijing (CN); Zhiqiang Wang, Beijing (CN); Wenhong Tian, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/881,213

(22) PCT Filed: Jul. 29, 2022

(86) PCT No.: PCT/CN2022/109148

§ 371 (c)(1),
(2) Date: Jan. 3, 2025

(87) PCT Pub. No.: WO2024/021080

PCT Pub. Date: Feb. 1, 2024

(65) Prior Publication Data

US 2025/0308472 A1 Oct. 2, 2025

(51) Int. Cl.
*G09G 3/34* (2006.01)

(52) U.S. Cl.
CPC ... *G09G 3/3426* (2013.01); *G09G 2300/0819* (2013.01); *G09G 2320/0233* (2013.01); *G09G 2320/064* (2013.01)

(58) Field of Classification Search
CPC ......... G09G 3/3426; G09G 2300/0819; G09G 2320/0233; G09G 2320/064; G09G 3/3413; G09G 3/3406
See application file for complete search history.

(56) References Cited

U.S. PATENT DOCUMENTS

2011/0018906 A1 1/2011 Chiu
2016/0042699 A1* 2/2016 Min .................... G09G 3/3413 345/82

(Continued)

FOREIGN PATENT DOCUMENTS

CN 101778503 A 7/2010
CN 204087757 U 1/2015

(Continued)

OTHER PUBLICATIONS

International Search Report and Written Opinion received for PCT Patent Application No. PCT/CN2022/109148, mailed on Apr. 13, 2023, 13 pages (7 pages of English Translation and 6 pages of Original Document).

*Primary Examiner* — Dennis P Joseph
(74) *Attorney, Agent, or Firm* — ArentFox Schiff LLP; Michael Fainberg

(57) ABSTRACT

The present disclosure provides a driving circuit, a backlight module and a driving method therefor, and a display apparatus. The driving circuit includes a driving transistor and a voltage adjusting circuit; a source of the driving transistor is coupled to a first voltage signal end, a drain of the driving transistor is coupled to a light-emitting device group, and a gate of the driving transistor is coupled to an output terminal of the voltage adjusting circuit, where the light-emitting device group includes a plurality of light-emitting regions arranged in a first direction, and each light-emitting region includes at least one light-emitting device; a first input terminal of the voltage adjusting circuit is coupled to a second voltage signal end; the voltage of the second voltage signal end is a preset driving voltage Vgs of the driving transistor.

18 Claims, 12 Drawing Sheets

(56) References Cited

U.S. PATENT DOCUMENTS

| | | | | |
|---|---|---|---|---|
| 2016/0323954 | A1* | 11/2016 | Nozawa | G09G 3/3406 |
| 2022/0061135 | A1* | 2/2022 | Gu | H05B 45/14 |

FOREIGN PATENT DOCUMENTS

| | | | |
|---|---|---|---|
| CN | 212810308 | U | 3/2021 |
| CN | 113140190 | A | 7/2021 |
| JP | 2007-299827 | A | 11/2007 |

* cited by examiner

DRIVING CIRCUIT, BACKLIGHT MODULE AND DRIVING METHOD THEREFOR, AND DISPLAY APPARATUS

CROSS-REFERENCE TO RELATED APPLICATIONS

This application is a National Stage of International Application No. PCT/CN2022/109148, filed on Jul. 29, 2022, which is hereby incorporated by reference in its entirety.

TECHNICAL FIELD

The present disclosure relates to the field of display technology, and in particular, relates to a driving circuit, a backlight module and a driving method therefor, and a display apparatus.

BACKGROUND

With the continuous development of display technology, in order to achieve the large-size and high-resolution display, liquid crystal display panels can use mini light-emitting diodes (Mini-LED) as the light source of the backlight module. The backlight source includes multiple Mini-LED light-emitting device groups. Each Mini-LED light-emitting device group includes multiple partitions. Each partition includes at least one Mini-LED. The multiple Mini-LED light-emitting device groups are driven through different driving circuits respectively. The driving current corresponding to each light-emitting device group is the same. However, in order to meet the structure and viewing range requirements of the display apparatus, the display apparatus usually has cut corners. The number of partitions in the Mini-LED light-emitting device group corresponding to the cut corner is less than the number of partitions in the Mini-LED light-emitting device group in the non-cut corner area. When the driving current corresponding to each Mini-LED light-emitting device group is the same, for a Mini-LED light-emitting device group, the driving current is evenly distributed to multiple partitions in the Mini-LED light-emitting device group. Since the number of partitions in the Mini-LED light-emitting device group corresponding to the cut corner is less than the number of partitions in the Mini-LED light-emitting device group in the non-cut corner area, thus, the current of one partition in the Mini-LED light-emitting device group corresponding to the cut corner is greater than the current of one partition in the LED light-emitting device group in the non-cut corner area. Therefore, the brightness of the Mini-LED in the Mini-LED light-emitting device group corresponding to the corner is greater than the brightness of the Mini-LED in the Mini-LED light-emitting device group in the non-corner area, resulting in a difference in brightness of different areas of the backlight module, which affects the display effect.

SUMMARY

An embodiment of the present disclosure provides a driving circuit. The driving circuit includes: a driving transistor and a voltage adjustment circuit. A source of the driving transistor is coupled to a first voltage signal terminal, a drain of the driving transistor is coupled to a light-emitting device group, and a gate of the driving transistor is coupled to an output terminal of the voltage adjustment circuit; where the light-emitting device group includes a plurality of light-emitting areas arranged along a first direction, and each light-emitting area includes at least one light-emitting device. A first input terminal of the voltage adjustment circuit is coupled to the second voltage signal terminal; a voltage of the second voltage signal terminal is a preset driving voltage Vgs of the driving transistor; and a quantity of light-emitting areas in the light-emitting device group is less than or equal to or greater than a preset quantity. The voltage adjustment circuit is configured to: in response to the quantity of the light-emitting areas in the light-emitting device group not being equal to the preset quantity, output a driving voltage Vgs' of the driving transistor based on the preset driving voltage input, the quantity of light-emitting areas in the light-emitting device group and the preset quantity; where Vgs' is not equal to Vgs.

In some embodiments, the driving voltage Vgs' of the driving transistor and the preset driving voltage Vgs satisfy:

$$Vgs' = \sqrt{\frac{m}{n}}(Vgs - Vth) + Vth;$$

where m is the quantity of light-emitting areas in the light-emitting device group, n is the preset quantity, and Vth is a threshold voltage of the driving transistor.

In some embodiments, the voltage adjustment circuit includes a first operational amplifier and a second operational amplifier;

a non-inverting input terminal of the first operational amplifier is coupled to the second voltage signal terminal; an inverting input terminal of the first operational amplifier is coupled to a positive electrode of a fixed voltage source, an inverting input terminal of the second operational amplifier and an output terminal of the second operational amplifier; an output terminal of the first operational amplifier is coupled to the inverting input terminal of the second operational amplifier;

a negative electrode of the fixed voltage source is grounded, and a voltage of the fixed voltage source is the threshold voltage Vth of the driving transistor;

a gain of the first operational amplifier is $$\sqrt{\frac{m}{n}};$$

and a non-inverting input terminal of the second operational amplifier is grounded, and the output terminal of the second operational amplifier is coupled to the gate of the driving transistor.

In some embodiments, the voltage adjustment circuit further includes: a first resistor, a second resistor, a third resistor and a fourth resistor;

a first terminal of the first resistor is coupled to the output terminal of the first operational amplifier, and a second terminal of the first resistor is coupled to the inverting input terminal of the second operational amplifier;

a first terminal of the second resistor is coupled to the inverting input terminal of the first operational amplifier, and a second terminal of the second resistor is coupled to the inverting input terminal of the second operational amplifier;

a first terminal of the third resistor is coupled to the output terminal of the second operational amplifier, and a second terminal of the third resistor is coupled to the inverting input terminal of the second operational amplifier;

a first terminal of the fourth resistor is grounded, and a second terminal of the fourth resistor is coupled to the non-inverting input terminal of the second operational amplifier; and resistance values of the first resistor, the second resistor, the third resistor and the fourth resistor are all the same.

In some embodiments, the voltage adjustment circuit further includes a filter capacitor; and a first electrode of the filter capacitor is coupled to the positive electrode of the fixed voltage source and the first terminal of the second resistor, and a second electrode of the filter capacitor is grounded.

In some embodiments, the voltage adjustment circuit further includes a first pulse modulation switch; and a first terminal of the first pulse modulation switch is coupled to the second voltage signal terminal, and a second terminal of the first pulse modulation switch is coupled to the non-inverting input terminal of the first operational amplifier.

In some embodiments, the driving circuit further includes a pulse modulation circuit connected in parallel with the first input terminal and the output terminal of the voltage adjustment circuit.

In some embodiments, the pulse modulation circuit includes: a second pulse modulation switch and a third pulse modulation switch; a first terminal of the second pulse modulation switch is coupled to the second voltage signal terminal, and a second terminal of the second pulse modulation switch is coupled to a first terminal of the third pulse modulation switch and the gate of the driving transistor; and a second terminal of the third pulse modulation switch is grounded.

In some embodiments, the driving circuit further includes: a third operational amplifier and a fourth operational amplifier;

a non-inverting input terminal of the third operational amplifier is coupled to the second voltage signal terminal, an inverting input terminal of the third operational amplifier is coupled to the source of the driving transistor, and an output terminal of the third operational amplifier is coupled to a non-inverting input terminal of the fourth operational amplifier; and an inverting input terminal of the fourth operational amplifier is coupled to an output terminal of the fourth operational amplifier, and the output terminal of the fourth operational amplifier is coupled to the first input terminal of the voltage adjustment circuit.

In some embodiments, the driving circuit further includes: an operational amplifier circuit and a fifth resistor; a first input terminal of the operational amplifier circuit is coupled to the second voltage signal terminal, a second input terminal of the operational amplifier circuit is coupled to a current magnification adjustment signal terminal, a third input terminal of the operational amplifier circuit is coupled to a first terminal of the fifth resistor, and an output terminal of the operational amplifier circuit is coupled to the non-inverting input terminal of the third operational amplifier; and a second terminal of the fifth resistor is grounded.

In some embodiments, the driving circuit further includes a feedback circuit; the feedback circuit includes a feedback resistor; a first terminal of the feedback resistor is coupled to the source of the driving transistor, and a second terminal of the feedback resistor is coupled to the first voltage signal terminal; and the first voltage signal terminal is a ground potential signal terminal.

In some embodiments, the driving transistor is an N-type metal-oxide-semiconductor field-effect transistor.

An embodiment of the present disclosure provides a backlight module, including: a plurality of light-emitting device groups, and a plurality of first driving circuits; the first driving circuit is the driving circuit according to the embodiments of the present disclosure;

each light-emitting device group includes a plurality of light-emitting areas arranged along a first direction, and each light-emitting area includes at least one light-emitting device;

the plurality of light-emitting device groups include a plurality of first light-emitting device groups and a plurality of second light-emitting device groups; a quantity of the light-emitting areas in each second light-emitting device group is equal to a preset quantity, and a quantity of light-emitting areas in each first light-emitting device group is smaller than the quantity of light-emitting areas in each second light-emitting device group; and the plurality of first light-emitting device groups are respectively coupled to different first driving circuits.

In some embodiments, the plurality of second light-emitting device groups are respectively coupled to different first driving circuits.

In some embodiments, the backlight module further includes a plurality of second driving circuits; the plurality of second light-emitting device groups are respectively coupled to different second driving circuits; and each second driving circuit includes: a driving transistor, a pulse modulation circuit, a voltage stabilizing circuit, a feedback circuit, an operational amplifier circuit and a fifth resistor.

An embodiment of the present disclosure provides a driving method for the backlight module, including:

controlling inputting the preset driving voltage to the driving circuit coupled to the first light-emitting device group; and controlling the voltage adjustment circuit to output the driving voltage of the driving transistor based on the preset driving voltage, the quantity of the light-emitting areas and the preset quantity, to control the driving transistor to be turned on, and drive light-emitting devices in the first light-emitting device group to emit light.

In some embodiments, the voltage adjustment circuit includes a first pulse modulation switch. While controlling inputting the preset driving voltage to the driving circuit coupled to the first light-emitting device group, the method further includes:

controlling the first pulse modulation switch to be turned on, and providing the preset driving voltage to the first input terminal of the voltage adjustment circuit through the first pulse modulation switch.

In some embodiments, the driving circuit further includes a second pulse modulation switch and a third pulse modulation switch. While controlling the first pulse modulation switch to be turned on, the method further includes:

controlling the second pulse modulation switch and the third pulse modulation switch to be turned off.

In some embodiments, the plurality of second light-emitting device groups are respectively coupled to different driving circuits. The method further includes:

controlling the first pulse modulation switch of the driving circuit coupled to the first light-emitting device group to be turned off, controlling the second pulse modulation switch to be turned on, controlling the driving transistor to be turned on, and driving light-emitting devices in the second light-emitting device group to emit light.

An embodiment of the present disclosure provides a display apparatus, including:

the backlight module according to the embodiments of the present disclosure; and the display panel located on a light-emitting side of the backlight module.

BRIEF DESCRIPTION OF FIGURES

In order to more clearly illustrate the technical solutions in the embodiments of the present disclosure, a brief introduction will be given below to the drawings that need to be used in the description of the embodiments. Obviously, the drawings in the following description are only some embodiments of the present disclosure. Those of ordinary skill in the art can also obtain other drawings based on these drawings without exerting creative efforts.

DETAILED DESCRIPTION

Figure 1:
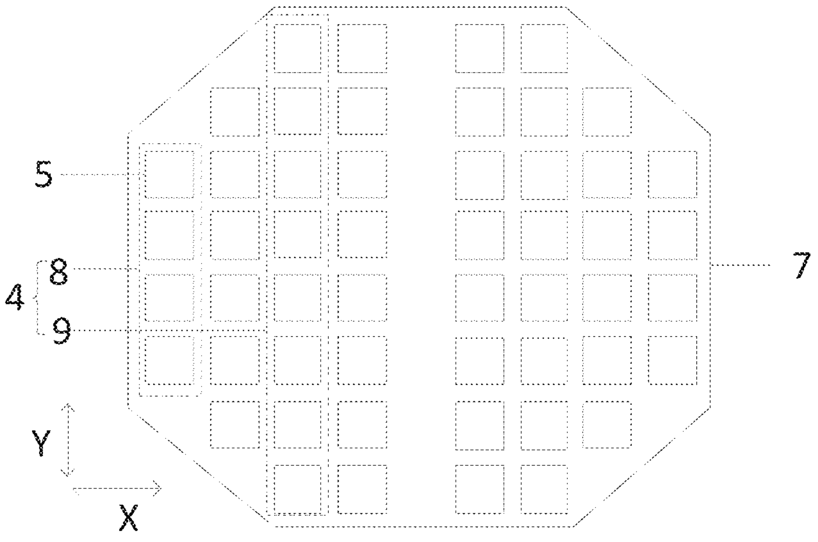
FIG. 1 is a schematic diagram of a structure of a backlight module provided by an embodiment of the present disclosure.

In order to make the purpose, technical solutions and advantages of the embodiments of the present disclosure more clear, the technical solutions of the embodiments of the present disclosure will be clearly and completely described below in conjunction with the drawings of the embodiments of the present disclosure. Obviously, the described embodiments are some, but not all, of the embodiments of the present disclosure. And the embodiments and features in the embodiments of the present disclosure may be combined with each other without conflict. Based on the described embodiments of the present disclosure, all other embodiments obtained by those of ordinary skill in the art without creative efforts fall within the scope of protection of the present disclosure.

Unless otherwise defined, technical terms or scientific terms used in this disclosure shall have the usual meaning understood by a person with ordinary skill in the art to which this disclosure belongs. "First", "second" and similar words used in this disclosure do not indicate any order, quantity or importance, but are only used to distinguish different components. Words such as "include" or "comprise" mean that the element or thing appearing before the word includes the elements or things listed after the word and their equivalents, without excluding other elements or things. Words such as "coupled" or "connected" are not limited to physical or mechanical connections, but may include electrical connections, whether direct or indirect.

It should be noted that the sizes and shapes of the figures in the drawings do not reflect true proportions and are only intended to illustrate the present disclosure. And the same or similar reference numbers throughout represent the same or similar elements or elements with the same or similar functions.

In the related art, a non-rectangular backlight module is, for example, as shown in FIG. 1, and the shape of the backlight module 7 is a shape like a rectangular with cut corners, that is, a shape in which the right-angled areas of the rectangle are cut off. The plurality of light-emitting device groups 4 include a plurality of first light-emitting device groups 8 and a plurality of second light-emitting device groups 9. The first light-emitting device groups 8 are located in areas corresponding to the cut corners, and the second light-emitting device groups 9 are located in areas outside the cut corners. The quantity of light-emitting areas 5 in the first light-emitting device group 8 is less than the quantity of light-emitting areas in the second light-emitting device group 9. The quantity of light-emitting areas included in the second light-emitting device group 9 is the preset quantity. That is, due to the existence of the cut corners, the quantity of light-emitting areas 5 included in the first light-emitting device group 8 located in the area corresponding to the cut corner is less than the preset quantity. In specific implementation, the driving transistor needs to be used to drive the light-emitting device group to emit light. The driving current of the driving transistor, that is, the total current I of each light-emitting device group, satisfies the following condition:

$$I = (1/2)UnCox(W/L) * (V' - Vth)^2. \tag{1}$$

Herein, Un is the migration rate of electrons, Cox is the gate oxide capacitance per unit area, W/L is a width-to-length ratio of the oxide layer of the driving transistor, V' is the gate voltage of the driving transistor, and Vth is the threshold voltage of the driving transistor. Taking the first light-emitting device group 8 corresponding to the reference numeral in FIG. 1 as an example, the first light-emitting device group 8 includes four light-emitting areas, and the second light-emitting device groups 9 each include eight light-emitting areas. The driving current of each light-emitting area in the first light-emitting device group 8 is I/4, and the driving current of each light-emitting area in the second light-emitting device group 9 is I/8. The driving current of each light-emitting area in the first light-emitting device group 8 is greater than the driving current of each light-emitting area in the second light-emitting device group 9. Correspondingly, the brightness of each light-emitting area in the first light-emitting device group 8 is higher than that of each light-emitting area in the second light-emitting device group 9. There is a large difference between the brightness of the cut corner area and the brightness of the non-cut corner area of the backlight module, which affects the brightness uniformity of the backlight module. When the backlight module is used in a display product, it further affects the display uniformity of the display product.

Figure 2:
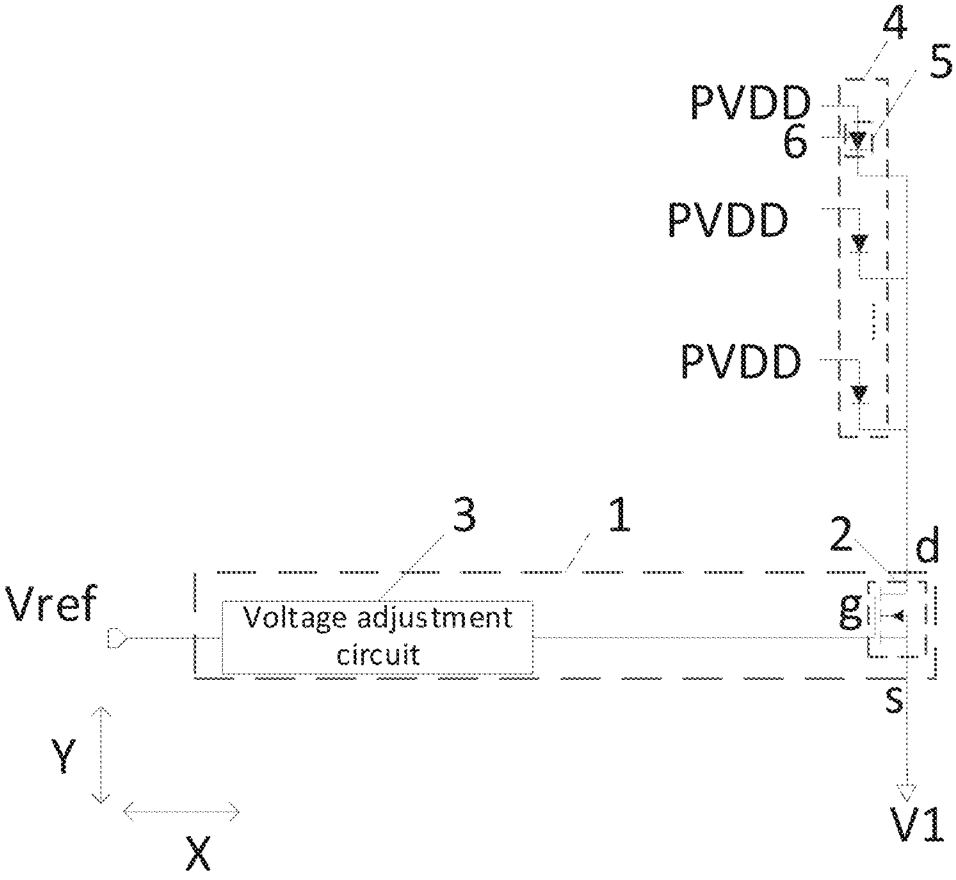
FIG. 2 is a schematic diagram of a structure of a driving circuit provided by an embodiment of the present disclosure.

The embodiments of the present disclosure provide a driving circuit. As shown in FIG. 2, the driving circuit 1 includes: a driving transistor 2 and a voltage adjustment circuit 3.

The source S of the driving transistor 2 is coupled to the first voltage signal terminal V1. The drain d of the driving transistor 2 is configured to couple to the light-emitting device group 4. The gate g of the driving transistor 2 is coupled to the output terminal of the voltage adjustment circuit 1. The light-emitting device group 4 includes a plurality of light-emitting areas 5 arranged along the first direction Y. Each light-emitting area 5 includes at least one light-emitting device 6. The quantity of the light-emitting areas 5 included in the light-emitting device group 4 is less than or equal to or greater than a preset quantity.

The first input terminal of the voltage adjustment circuit 3 is coupled to the second voltage signal terminal Vref. The voltage of the second voltage signal terminal Vref is the preset driving voltage Vgs of the driving transistor 2.

The voltage adjustment circuit 3 is configured to: output the driving voltage Vgs' of the driving transistor 2 according to the input preset driving voltage, the quantity of light-emitting areas included in the light-emitting device group 4 and the preset quantity, when the quantity of light-emitting areas 5 included in the light-emitting device group 4 is not equal to the preset quantity, where Vgs' is not equal to Vgs.

The driving circuit provided by the embodiments of the present disclosure includes a voltage adjustment circuit. The voltage adjustment circuit can adjust the input preset driving voltage according to the quantity of light-emitting areas in the light-emitting device group coupled to the driving circuit and the preset quantity, so that the driving voltage Vgs' of the driving transistor output by the voltage adjustment circuit is not equal to the preset driving voltage Vgs. In this way, the total driving current of the light-emitting device group is not equal to the total driving current corresponding to the preset driving voltage Vgs. Compared with the situation where the preset driving voltage Vgs is used for controlling the driving transistor to be turned on to drive the light-emitting device group to emit light, it can increase or decrease the luminous brightness of each light-emitting device in the light-emitting device group, which avoids a large difference in brightness in different areas of the backlight module and avoids affecting the brightness uniformity of the backlight module.

In some embodiments, when the quantity of light-emitting areas included in the light-emitting device group is less than the preset quantity, the voltage adjustment circuit is configured to: output the driving voltage Vgs' of the driving transistor based on the input preset driving voltage, the quantity of light-emitting areas included in the light-emitting device group, and the preset quantity, where, Vgs'<Vgs.

In the driving circuit provided by the embodiments of the present disclosure, when the quantity of light-emitting areas included in the light-emitting device group coupled to the driving circuit is less than a preset quantity, the voltage adjustment circuit can adjust the input preset driving voltage according to the quantity of light-emitting areas in the light-emitting device group coupled to the driving circuit, and the preset quantity, so that the driving voltage Vgs' of the driving transistor output by the voltage adjustment circuit is less than the preset driving voltage Vgs. Correspondingly, the total driving current of the light-emitting device group is less than the total driving current corresponding to the preset driving voltage Vgs. Compared with the situation where the preset driving voltage Vgs is used for controlling the driving transistor to be turned on to drive the light-emitting device group to emit light, the luminous brightness of each light-emitting device in the light-emitting device group can be decreased, which avoids a large difference in brightness in different areas of the backlight module and avoids affecting the brightness uniformity of the backlight module.

Of course, a light-emitting device group in FIG. 2 can also be a light-emitting device group with a quantity of light-emitting areas greater than a preset quantity. In the case where the quantity of light-emitting areas included in the light-emitting device group is greater than the preset quantity, in some embodiments, the voltage adjustment circuit is configured to: output the driving voltage Vgs' of the driving transistor based on the input preset driving voltage, the quantity of light-emitting areas included in the light-emitting device group and the preset quantity, where, Vgs'>Vgs.

In the driving circuit provided by the embodiments of the present disclosure, when the quantity of light-emitting areas included in the light-emitting device group coupled to the driving circuit is greater than the preset quantity, the total driving current of the light-emitting device group is greater than the total driving current corresponding to the preset driving voltage Vgs. Compared with the situation where the preset driving voltage Vgs is used for controlling the driving transistor to be turned on to drive the light-emitting device group to emit light, the luminous brightness of each light-emitting device in the light-emitting device group can be increased, to avoid a large difference in brightness in different areas of the backlight module, and avoid affecting the brightness uniformity of the backlight module.

It should be noted that, for the convenience of description, the light-emitting device group whose quantity of light-emitting areas is not equal to the preset quantity will be described as the first light-emitting device group, and the light-emitting device group whose quantity of light-emitting areas is equal to the preset quantity will be described as the second light-emitting device group. The second light-emitting device group also needs to be coupled to the driving transistor, so that the light-emitting devices in the second light-emitting device group can be controlled to emit light through the driving transistor.

In specific implementation, the first light-emitting device groups are usually located at the edges of the backlight module, and the quantity of the first light-emitting device groups is usually less than the quantity of the second light-emitting device groups. The driving voltage of the first light-emitting device group is adjusted instead of adjusting the driving voltage of the second light-emitting device group, which can reduce the design and driving difficulty of the backlight module.

In specific implementation, the driving voltage of the driving transistor coupled to the second light-emitting device group is the preset driving voltage Vgs. Correspondingly, the driving current of the driving transistor coupled to the second light-emitting device group, that is, the total driving current of the second light-emitting device group is $Id=(1/2)UnCox(W/L)*(Vgs-Vth)^2$. The quantity of light-emitting areas included in the second light-emitting device group is n, that is, the preset quantity is n. Therefore, the driving current corresponding to each light-emitting area in the second light-emitting device group is $$\frac{Id}{n}.$$

When the driving voltage of the driving transistor in the driving circuit provided by the embodiment of the present disclosure is Vgs', the driving current of the driving transistor coupled to the first light-emitting device group, that is, the total driving current of the first light-emitting device group is $Id'=(1/2)UnCox(W/L)*(Vgs'-Vth)^2$. The quantity of light-emitting areas included in the first light-emitting device group is m, so the driving current corresponding to each light-emitting area in the first light-emitting device group is $$\frac{Id'}{m}.$$

In some embodiments, $$\frac{Id'}{m} = \frac{Id}{n},$$

and thus the driving current corresponding to each light-emitting area in the first light-emitting device group is equal to the driving current corresponding to each light-emitting area in the second light-emitting device group. The brightness of the light-emitting devices in light-emitting device groups is the same, which can eliminate the brightness differences in different areas of the backlight module and provide brightness uniformity that affects the backlight module.

Specifically, according to $$\frac{Id'}{m} = \frac{Id}{n},$$

it can be deduced:

$$\frac{(1/2)UnCox\,(W/L)\,(Vgs'-Vth)^2}{m} = \frac{(1/2)UnCox\,(W/L)\,(Vgs-Vth)^2}{n};\ \text{and}$$

$$\frac{(Vgs'-Vth)^2}{m} = \frac{(Vgs-Vth)^2}{n}.$$

So it can be concluded that the driving voltage Vgs' of the driving transistor and the preset driving voltage Vgs satisfy:

$$Vgs' = \sqrt{\frac{m}{n}}\,(Vgs-Vth)+Vth.$$

That is, when the driving voltage of the driving transistor coupled to the second light-emitting device group is the preset driving voltage Vgs, and the first light-emitting device group is coupled to the driving circuit provided by the embodiment of the present disclosure, the input preset driving voltage is adjusted by the voltage adjustment circuit, so that the driving voltage of the driving transistor output by the voltage adjustment circuit is $$Vgs' = \sqrt{\frac{m}{n}}\,(Vgs-Vth)+Vth,$$

which can make the brightness of the light-emitting devices in the first light-emitting device group the same as the brightness of the light-emitting devices in the second light-emitting device group, thereby eliminating the brightness differences in different areas in the backlight module, and providing brightness uniformity that affects the backlight module.

Figure 3:
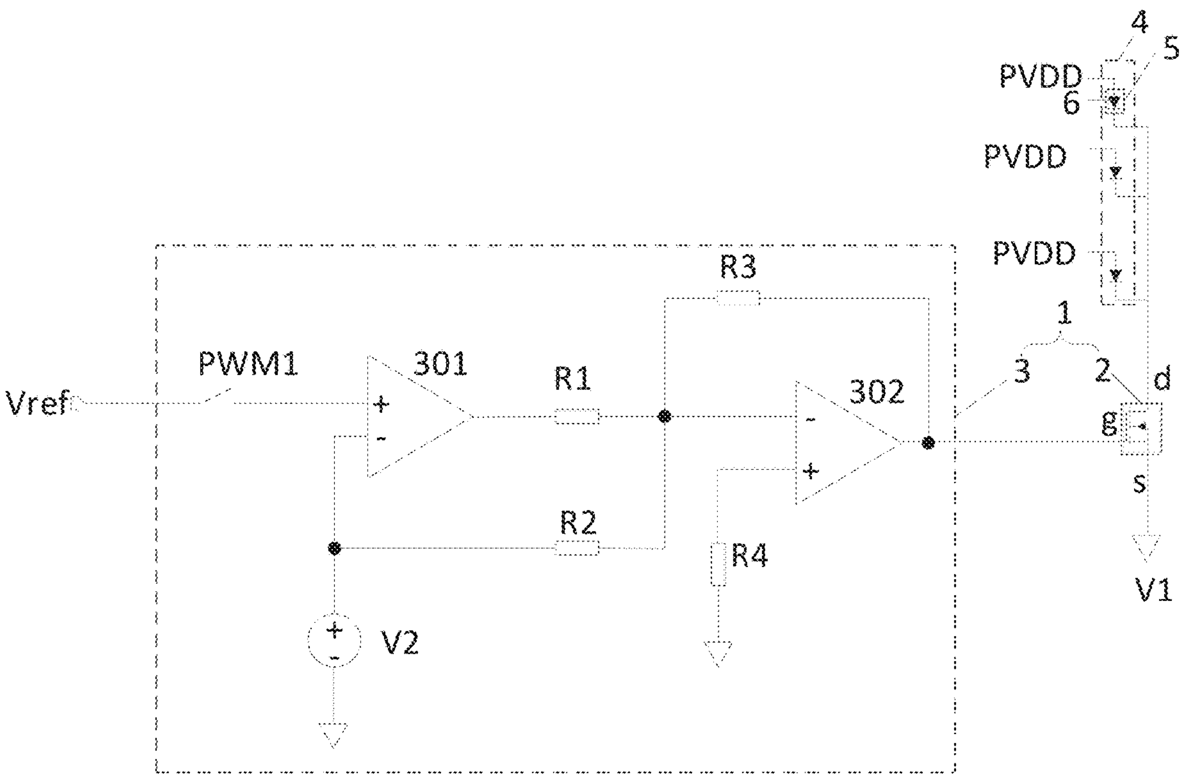
FIG. 3 is another schematic diagram of a structure of a driving circuit provided by an embodiment of the present disclosure.

In some embodiments, as shown in FIG. 3, the voltage adjustment circuit 3 includes: a first operational amplifier 301 and a second operational amplifier 302.

The non-inverting input terminal of the first operational amplifier 301 is coupled to the second voltage signal terminal Vref. The inverting input terminal of the first operational amplifier 301 is coupled to the positive electrode of the fixed voltage source V2, the inverting input terminal of the second operational amplifier 302 and the output terminal of the second operational amplifier 302. The output terminal of the first operational amplifier 301 is coupled with the inverting input terminal of the second operational amplifier 302.

The negative electrode of the fixed voltage source V2 is grounded, and the voltage of the fixed voltage source V2 is the threshold voltage Vth of the driving transistor.

The gain of the first operational amplifier 301 is $$\sqrt{\frac{m}{n}},$$

where m is the quantity of light-emitting areas and n is the preset quantity.

The non-inverting input terminal of the second operational amplifier 302 is ground, and the output terminal of the second operational amplifier 302 is coupled to the gate g of the driving transistor 2.

In specific implementation, the gain of the first operational amplifier is determined according to the quantity of light-emitting areas in the light-emitting device group and the preset quantity. The non-inverting input terminal of the first operational amplifier serves as the first input terminal of the voltage adjustment circuit. The voltage input to the non-inverting input terminal of the first operational amplifier is Vgs. The voltage input to the inverting input terminal of the first operational amplifier is Vth. Since the gain of the first operational amplifier is $$\sqrt{\frac{m}{n}},$$

thus, the output terminal of the first operational amplifier outputs a voltage of $$V301=\sqrt{\frac{m}{n}}(Vgs-Vth).$$

When the output terminal of the first operational amplifier outputs a voltage V301, the inverting input terminal of the second operational amplifier 302 is also coupled with the positive electrode of the fixed voltage source V2 and the fixed voltage source V2 outputs a voltage Vth, V301 and Vth serve as the voltages input to the inverting input terminal of the second operational amplifier 302.

Figure 4:
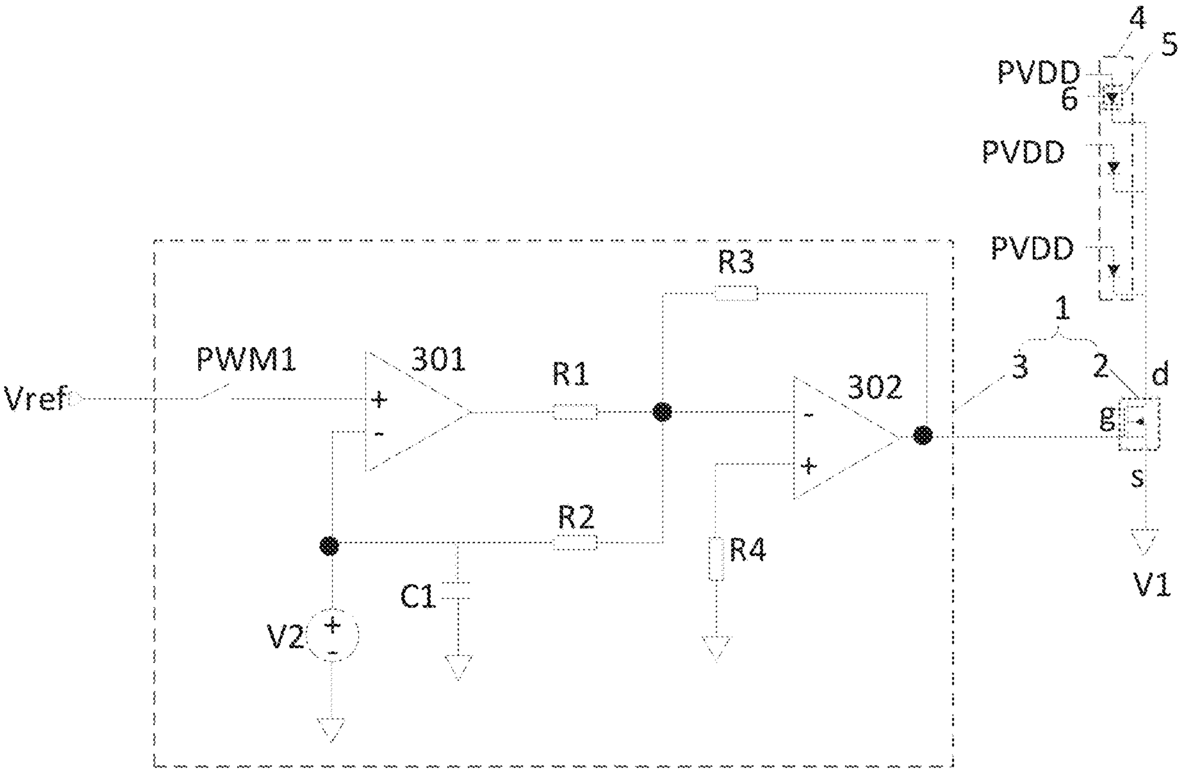
FIG. 4 is another schematic diagram of a structure of a driving circuit provided by an embodiment of the present disclosure.

In some embodiments, as shown in FIG. 4, the voltage adjustment circuit further includes: a first resistor R1, a second resistor R2, a third resistor R3, and a fourth resistor R4.

The first terminal of the first resistor R1 is coupled to the output terminal of the first operational amplifier 301, and the second terminal of the first resistor R1 is coupled to the inverting input terminal of the second operational amplifier 302.

The first terminal of the second resistor R2 is coupled to the inverting input terminal of the first operational amplifier 301, and the second terminal of the second resistor R2 is coupled to the inverting input terminal of the second operational amplifier 302.

The first terminal of the third resistor R3 is coupled to the output terminal of the second operational amplifier 302, and the second terminal of the third resistor R3 is coupled to the inverting input terminal of the second operational amplifier 302.

The first terminal of the fourth resistor R4 is grounded, and the second terminal of the fourth resistor R4 is coupled to the non-inverting input terminal of the second operational amplifier 302.

The resistance values of the first resistor R1, the second resistor R2, the third resistor R3 and the fourth resistor R4 are all the same.

In specific implementation, for the voltage adjustment circuit as shown in FIG. 4, when the output terminal of the first operational amplifier outputs a voltage V301, the inverting input terminal of the second operational amplifier 302 is also coupled to the positive electrode of the fixed voltage source V2 and the fixed voltage source V2 outputs a voltage Vth, V301 and Vth serve as voltages input to the inverting input terminal of the second operational amplifier 302. Since the non-inverting input terminal of the second operational amplifier 302 is grounded through the fourth resistor, according to the virtual short principle, it can be concluded that the voltage $V_-$ of the inverting input terminal of the second operational amplifier 302 is equal to the voltage $V_+$ of the non-inverting input terminal of the second operational amplifier 302, that is, being equal to 0. The resistance values of the first resistor R1, the second resistor R2, the third resistor R3 and the fourth resistor R4 are all R. According to the virtual short principle, the sum of the currents passing through the second resistor R2 and the first resistor R1 is equal to the current passing through the third resistor R3. Therefore, $(V301-V_-)/R+(Vth-V_-)/R=(V302-V_-)/R$, where V302 is the voltage output by the output terminal of the second operational amplifier 302. By bringing $V_-=0$, $(V301-0)/R+(Vth-0)/R=(V302-0)/R$ can be obtained, and then $$V302=V301+Vth=\sqrt{\frac{m}{n}}(Vgs-Vth)+Vth$$

can be obtained. The voltage V302 output by the output terminal of the second operational amplifier 302 is the driving voltage Vgs' of the drive transistor. Therefore, using the voltage adjustment circuit provided by the embodiments of the present disclosure to adjust the preset driving voltage, the driving voltage of the driving transistor output by the voltage adjustment circuit can be $$Vgs'=\sqrt{\frac{m}{n}}(Vgs-Vth)+Vth,$$

and the brightness of the light-emitting devices in the first light-emitting device group is the same as the brightness of the light-emitting devices in the second light-emitting device group, which can eliminate brightness differences in different areas of the backlight module and provide brightness uniformity that affects the backlight module. Moreover, by determining the gain of the first operational amplifier according to the quantity of light-emitting areas in the light-emitting device group and the preset quantity, the voltage adjustment circuit provided by the embodiments of the present disclosure is used for adjusting the driving voltage of the driving transistor, so that the method is simple and the adjustment effect is accurate.

In some embodiments, the first operational amplifier is a programmable operational amplifier.

It should be noted that when the backlight module includes multiple light-emitting device groups and the multiple light-emitting device groups include multiple first light-emitting device groups, the multiple first light-emitting device groups need to be coupled to different driving circuits. The value n of the multiple first light-emitting device groups is the same, but values m of the multiple first light-emitting device groups may not be exactly the same. For the first light-emitting device groups with different values m, the gains of the first operational amplifiers in the driving circuits respectively coupled to the first light-emitting device groups are also different. The first operational amplifier in the driving circuit provided by the embodiments of the present disclosure is a programmable operational amplifier, so that the gain of the first operational amplifier can be specifically set through programming according to the specific values of m and n.

In some embodiments, the second operational amplifier is a negative feedback operational amplifier.

In some embodiments, as shown in FIG. 4, the voltage adjustment circuit 3 further includes: a filter capacitor C1. The first electrode of the filter capacitor C1 is coupled to the positive electrode of the fixed voltage source V2 and the first terminal of the second resistor R2. The second electrode of capacitor C1 is grounded.

In the driving circuit provided by the embodiments of the present disclosure, the voltage adjustment circuit further includes a filter capacitor, so that alternating current (AC) signals can be filtered out, making the working performance of the voltage adjustment circuit more stable.

In some embodiments, as shown in FIGS. 3 and 4, the voltage adjustment circuit 1 further includes: a first pulse modulation switch PWM1. The first terminal of the first pulse modulation switch PWM1 is coupled to the second voltage signal terminal Vref, and the second terminal of the first pulse modulation switch PWM1 is coupled to the non-inverting input terminal of the first operational amplifier 301.

In specific implementation, when the voltage adjustment circuit needs to be used to adjust the driving voltage of the driving transistor, the first pulse modulation switch PWM1 is controlled to be turned on. When there is no need to use the voltage adjustment circuit to adjust the driving voltage of the driving transistor, the first pulse modulation switch PWM1 is controlled to be turned off.

Figure 5:
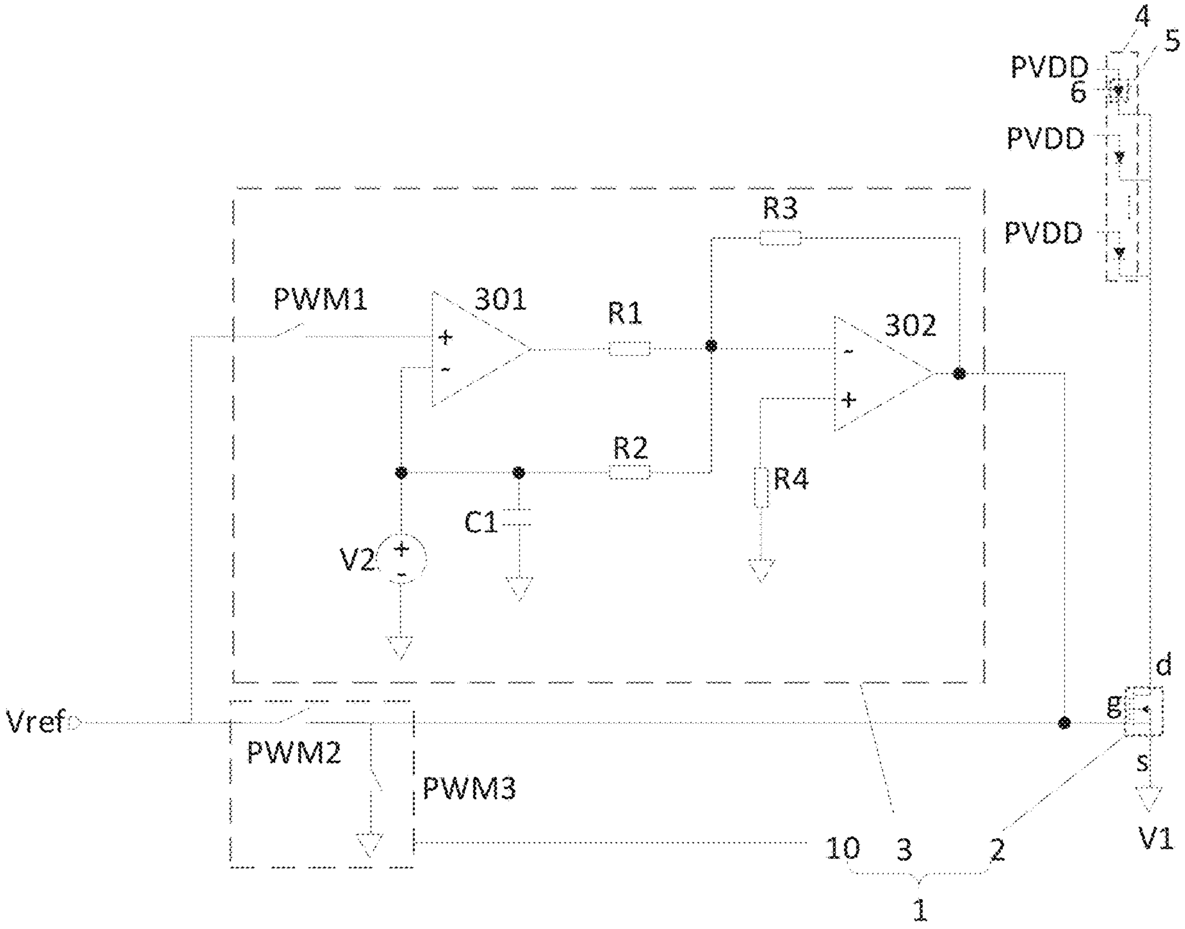
FIG. 5 is another schematic diagram of a structure of a driving circuit provided by an embodiment of the present disclosure.

In some embodiments, as shown in FIG. 5, the driving circuit further includes a pulse modulation circuit 10 connected in parallel with the first input terminal and the output terminal of the voltage adjustment circuit 3.

In some embodiments, as shown in FIG. 5, the pulse modulation circuit 10 includes: a second pulse modulation switch PWM2 and a third pulse modulation switch PWM3.

The first terminal of the second pulse modulation switch PWM2 is coupled to the second voltage signal terminal Vref, and the second terminal of the second pulse modulation switch PWM2 is coupled to the first terminal of the third pulse modulation switch PWM3 and the gate g of the driving transistor 2. The second terminal of the third pulse modulation switch PWM3 is grounded.

In specific implementation, when the voltage adjustment circuit needs to be used to adjust the driving voltage of the driving transistor, the first pulse modulation switch PWM1 is controlled to be turned on and the second pulse modulation switch PWM2 is controlled to be turned off. When there is no need to use the voltage adjustment circuit to adjust the driving voltage of the driving transistor, the first pulse modulation switch PWM1 is controlled to be turned off. In this case, both the second pulse modulation switch PWM2 and the third pulse modulation switch PWM3 can be controlled to be turned on to control that the light-emitting devices in the light-emitting device group do not light up, or the driving voltage can be provided to the driving transistor through the second pulse modulation switch PWM2 by controlling the second pulse modulation switch PWM2 to be turned on and the third pulse modulation switch PWM3 to be turned off.

It should be noted that, in order to facilitate the production of the backlight module, the second light-emitting device group can also be coupled with the driving circuit provided by the embodiments of the present disclosure. However, since the quantity of light-emitting areas in the second light-emitting device group is not reduced, there is no need to adjust the driving voltage of the driving transistor through the voltage adjustment circuit. In this case, the first pulse modulation switch PWM1 can be controlled to be turned off, the second pulse modulation switch PWM2 can be controlled to be turned on, and the third pulse modulation switch PWM3 can be turned off to provide the driving voltage to the driving transistor through the second pulse modulation switch PWM2, to drive the light-emitting devices in the second light-emitting device group to emit light.

Figure 6:
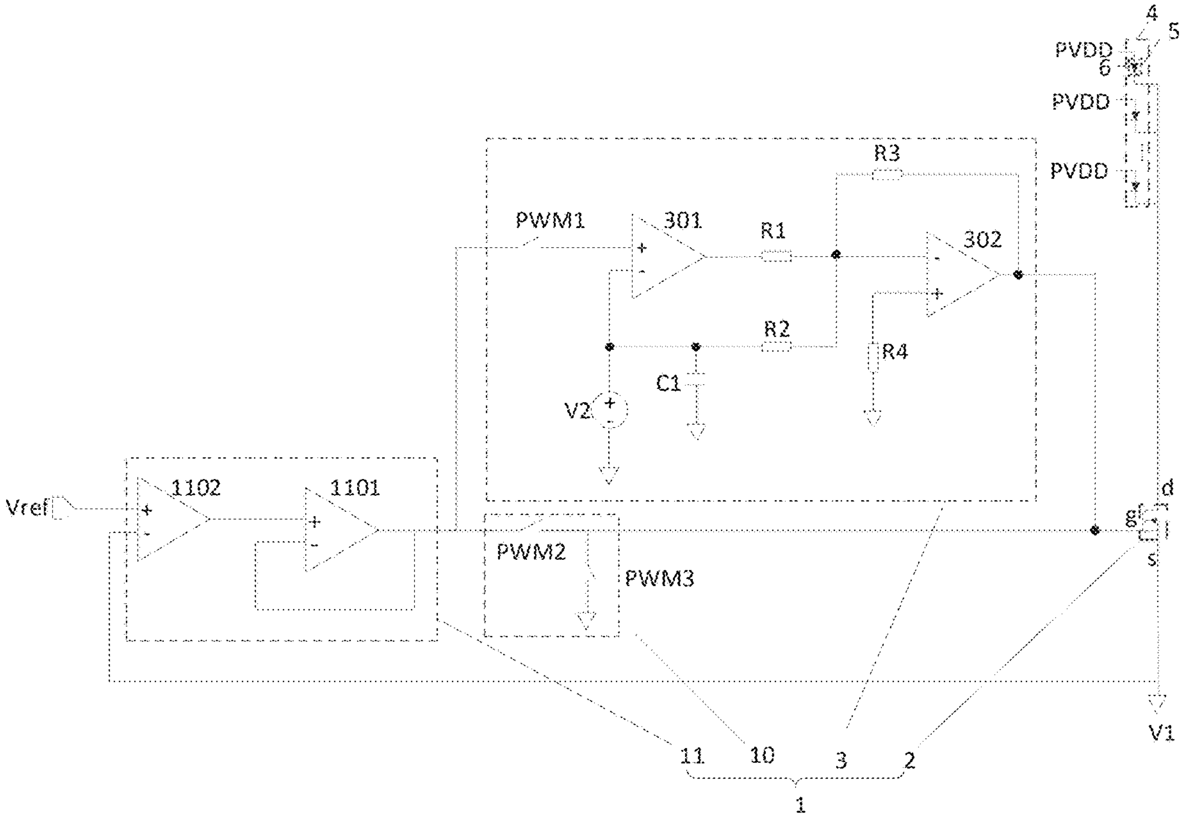
FIG. 6 is another schematic diagram of a structure of a driving circuit provided by an embodiment of the present disclosure.

In some embodiments, as shown in FIG. 6, the driving circuit further includes: a voltage stabilizing circuit 11. The voltage stabilizing circuit 11 includes: a third operational amplifier 1102 and a fourth operational amplifier 1101.

The non-inverting input terminal of the third operational amplifier 1102 is coupled to the second voltage signal terminal Vref, the inverting input terminal of the third operational amplifier 1102 is coupled to the source s of the driving transistor 2, and the output terminal of the third operational amplifier 1102 is coupled to the non-inverting input terminal of the four operational amplifier 1101.

The inverting input terminal of the fourth operational amplifier 1101 is coupled to the output terminal of the fourth operational amplifier 1101, and the output terminal of the fourth operational amplifier 1101 is coupled to the first input terminal of the voltage adjustment circuit 3.

In specific implementation, as shown in FIG. 6, when the voltage adjustment circuit 3 includes the first pulse modulation switch PWM1, the output terminal of the fourth operational amplifier 1101 is coupled with the non-inverting input terminal of the first operational amplifier 301 through the first pulse modulation switch PWM1. When the driving circuit 1 further includes a pulse modulation circuit 10, the output terminal of the fourth operational amplifier 1101 is also coupled to the first terminal of the second pulse modulation switch PWM2.

Figure 7:
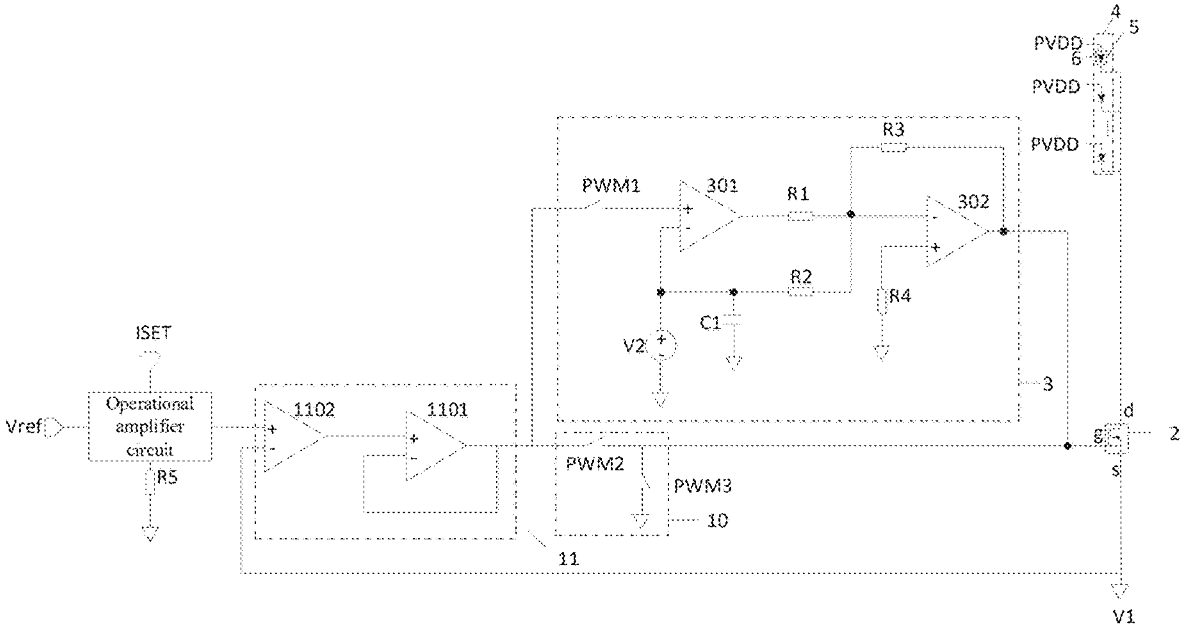
FIG. 7 is another schematic diagram of a structure of a driving circuit provided by an embodiment of the present disclosure.

In some embodiments, as shown in FIG. 7, the driving circuit further includes: an operational amplifier circuit and a fifth resistor R5. The first input terminal of the operational amplifier circuit is coupled to the second voltage signal terminal Vref, the second input terminal of the operational amplifier circuit is coupled to the current magnification adjustment signal terminal ISET, the third input terminal of the operational amplifier circuit is coupled to the first terminal of the fifth resistor R5, and the output terminal of the operational amplifier circuit is coupled to the non-inverting input terminal of the third operational amplifier 1102.

The second terminal of the fifth resistor R5 is grounded.

During specific implementation, the reference voltage is input into the first input terminal of the operational amplifier circuit, and the operational amplifier circuit adjusts the current magnification of the reference voltage under the control of the current magnification adjustment signal of the current magnification adjustment signal terminal ISET, and outputs the reference voltage after the current magnification adjustment.

Figure 8:
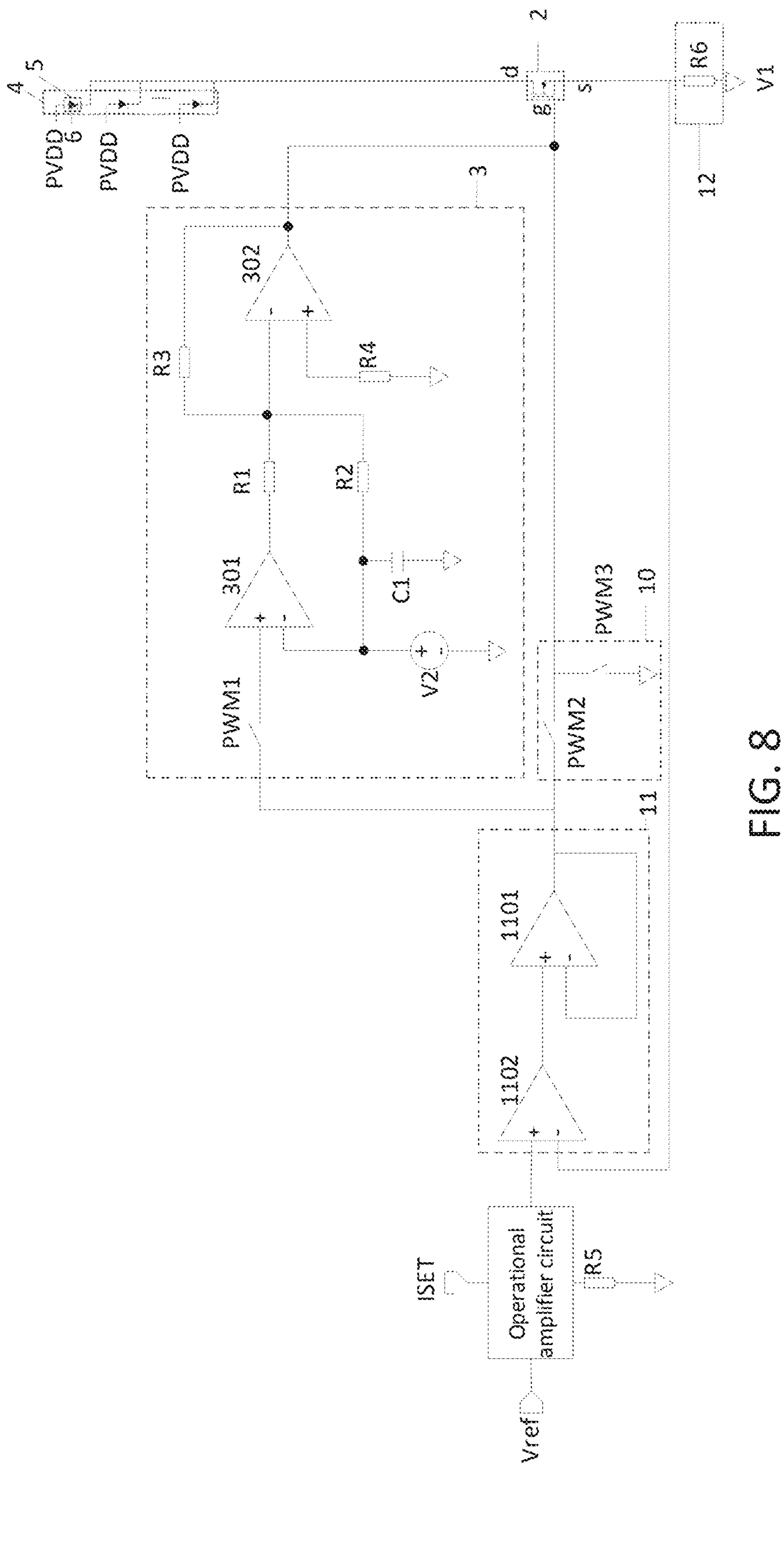
FIG. 8 is another schematic diagram of a structure of a driving circuit provided by an embodiment of the present disclosure.

In some embodiments, as shown in FIG. 8, the driving circuit further includes: a feedback circuit 12. The feedback circuit includes a feedback resistor R6.

The first terminal of the feedback resistor R6 is coupled to the source s of the driving transistor 2, and the second terminal of the feedback resistor R6 is coupled to the first voltage signal terminal V1. The first voltage signal terminal V1 is a ground potential signal terminal.

Figure 9:
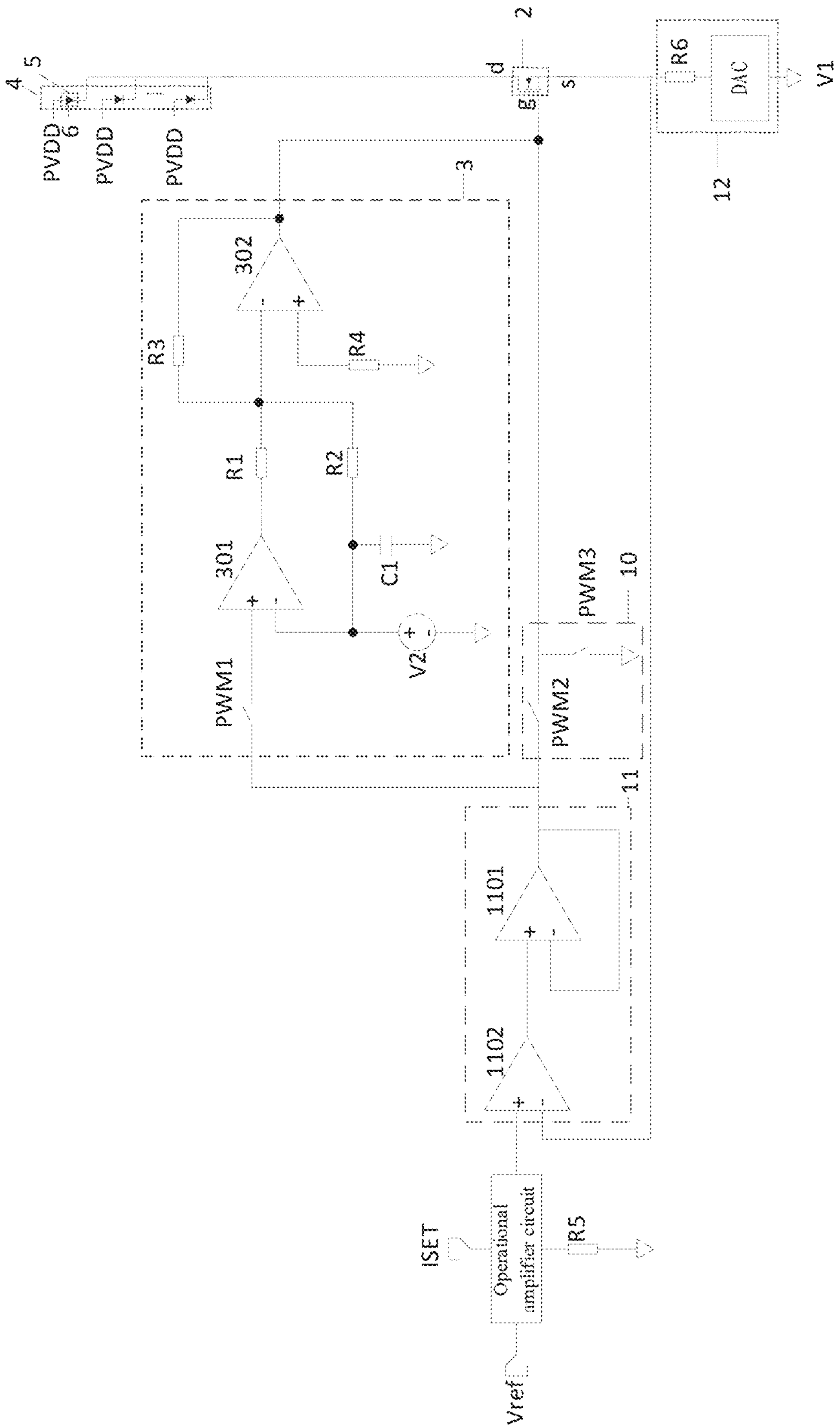
FIG. 9 is another schematic diagram of a structure of a driving circuit provided by an embodiment of the present disclosure.

In some embodiments, as shown in FIG. 9, the feedback circuit 12 further includes a digital-to-analog converter DAC located between the feedback resistor R6 and the ground potential signal terminal.

In some embodiments, the drive transistor is a metal-oxide-semiconductor field-effect transistor. For example, as shown in FIGS. 2 to 9, the driving transistor 2 is an N-type metal-oxide-semiconductor field-effect transistor. Of course, in specific implementation, the driving transistor may also be a P-type metal-oxide-semiconductor field-effect transistor.

Figure 10:
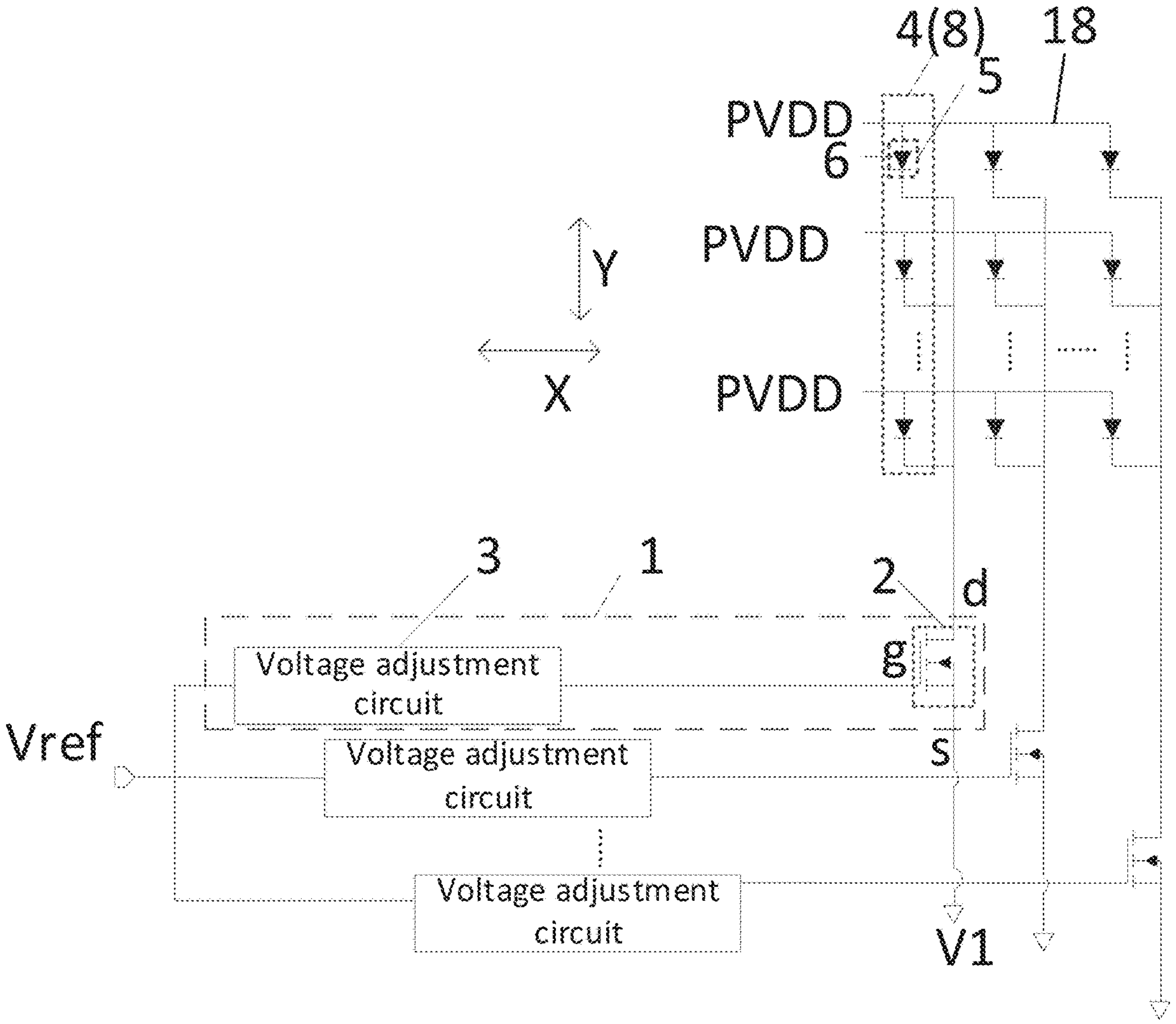
FIG. 10 is another schematic diagram of a structure of a backlight module provided by an embodiment of the present disclosure.

Based on the same inventive concept, embodiments of the present disclosure further provide a backlight module. As shown in FIGS. 1 and 10, the backlight module includes: a plurality of light-emitting device groups 4, and a plurality of first driving circuits. The first driving circuit is the driving circuit 1 provided by the embodiments of the present disclosure.

The light-emitting device group 4 includes a plurality of light-emitting areas 5 arranged along the first direction Y, and the light-emitting area 5 includes at least one light-emitting device 6.

The plurality of light-emitting device groups 4 include a plurality of first light-emitting device groups 8 and a plurality of second light-emitting device groups 9. The quantity of light-emitting areas 5 included in the second light-emitting device group 9 is equal to a preset quantity. The quantity of light-emitting areas 5 included in the first light-emitting device group 8 is not equal to the quantity of light-emitting areas 5 included in the second light-emitting device group 9.

The plurality of first light-emitting device groups are respectively coupled to different driving circuits 1 (i.e., first driving circuits).

The first driving circuit included in the backlight module provided by the embodiments of the present disclosure is the above-mentioned driving circuit provided by the embodiments of the present disclosure. Since the first driving circuit includes a voltage adjustment circuit, the voltage adjustment circuit can adjust the input preset driving voltage based on the quantity of light-emitting areas in the light-emitting device group coupled to the first driving circuit and the preset quantity, so that the driving voltage Vgs' of the driving transistor output by the voltage adjustment circuit is not equal to the preset driving voltage Vgs. When the first light-emitting device group is coupled to the first driving circuit, the total driving current of the first light-emitting device group is not equal to the total driving current corresponding to the preset driving voltage Vgs. Compared with the situation where the preset driving voltage Vgs is used for controlling the driving transistor to be turned on to drive the first light-emitting device group to emit light, the luminous brightness of each light-emitting device in the first light-emitting device group can be increased or reduced, to avoid a large difference in the brightness of the light-emitting devices in the first light-emitting device group and the second light-emitting device group, and avoid affecting the brightness uniformity of the backlight module.

It should be noted that FIG. 1 illustrates an example in which the quantity of light-emitting areas 5 included in the first light-emitting device group 8 is less than the quantity of light-emitting areas 5 included in the second light-emitting device group 9. When the first light-emitting device group is coupled to the first driving circuit, the voltage adjustment circuit can adjust the input preset driving voltage based on the quantity of light-emitting areas in the light-emitting device group coupled to the first driving circuit and the preset quantity, so that a driving voltage Vgs' of the driving transistor output by the voltage adjustment circuit is less than the preset driving voltage Vgs. Correspondingly, the total driving current of the first light-emitting device group is less than the total driving current corresponding to the preset driving voltage Vgs. Compared with the situation where the preset driving voltage Vgs is used to control the driving transistor to be turned on to drive the first light-emitting device group to emit light, the luminous brightness of each light-emitting device in the first light-emitting device group can be reduced, which avoids a large difference in the brightness of the light-emitting devices in the first light-emitting device group and the second light-emitting device group, and avoids affecting the brightness uniformity of the backlight module.

Of course, during specific implementation, the quantity of light-emitting areas included in the first light-emitting device group may be greater than the quantity of light-emitting areas included in the second light-emitting device group. When the first light-emitting device group is coupled to the first driving circuit, the voltage adjustment circuit can adjust the input preset driving voltage based on the quantity of light-emitting areas in the light-emitting device group coupled to the first driving circuit and the preset quantity, so that the driving voltage Vgs' of the driving transistor output by the voltage adjustment circuit is greater than the preset driving voltage Vgs. Correspondingly, the total driving current of the first light-emitting device group is greater than the total driving current corresponding to the preset driving voltage Vgs. Compared with the situation where the preset driving voltage Vgs is used to control the driving transistor to be turned on to drive the first light-emitting device group to emit light, the luminous brightness of each light-emitting device in the first light-emitting device group can be increased, which avoids a large difference in the brightness of the light-emitting devices in the first light-emitting device group and the second light-emitting device group, and avoids affecting the brightness uniformity of the backlight module.

In specific implementation, as shown in FIG. 1, the shape of the backlight module 7 is a shape like a rectangular with cut corners, that is, a shape in which the right-angled areas of the rectangle are cut off. In specific implementation, when the backlight module is applied to virtual reality (VR) display, for example, when applied to VR glasses, the VR glasses include two display screens, and each of the display screens includes the backlight module provided by the embodiments of the present disclosure. The shape of the backlight module corresponds to the shape of the display screen, that is, the entire display screen is also in a shape like a rectangular with cut corners, which can reduce the pupil distance of the two display screens. Moreover, for VR glasses, the user's human eyes are very close to the display screens when using the VR glasses, and the user will not notice the boundaries of the display screen. Therefore, corner cutting does not affect the viewing angle and can also reduce the weight of the VR glasses.

It should be noted that not all light-emitting device groups are shown in FIG. 1, and FIG. 1 illustrates an example in which the second light-emitting device group includes eight light-emitting areas, that is, the preset quantity of light-emitting areas is 8, and the first light-emitting device group includes four or six luminous areas. Of course, the quantity of light-emitting device groups, the preset quantity of light-emitting areas, and the quantity of light-emitting areas in the plurality of first light-emitting device groups can be set according to the actual size, shape and other requirements of the backlight module.

It should be noted that the second light-emitting device group is not shown in FIG. 10. In addition, FIG. 10 illustrates an example in which the first driving circuit includes a voltage adjustment circuit and a driving transistor. In specific implementation, the first driving circuit may also include a pulse modulation circuit, a voltage stabilizing circuit, a feedback circuit, an operational amplifier circuit and a fifth resistor, etc.

Figure 11:
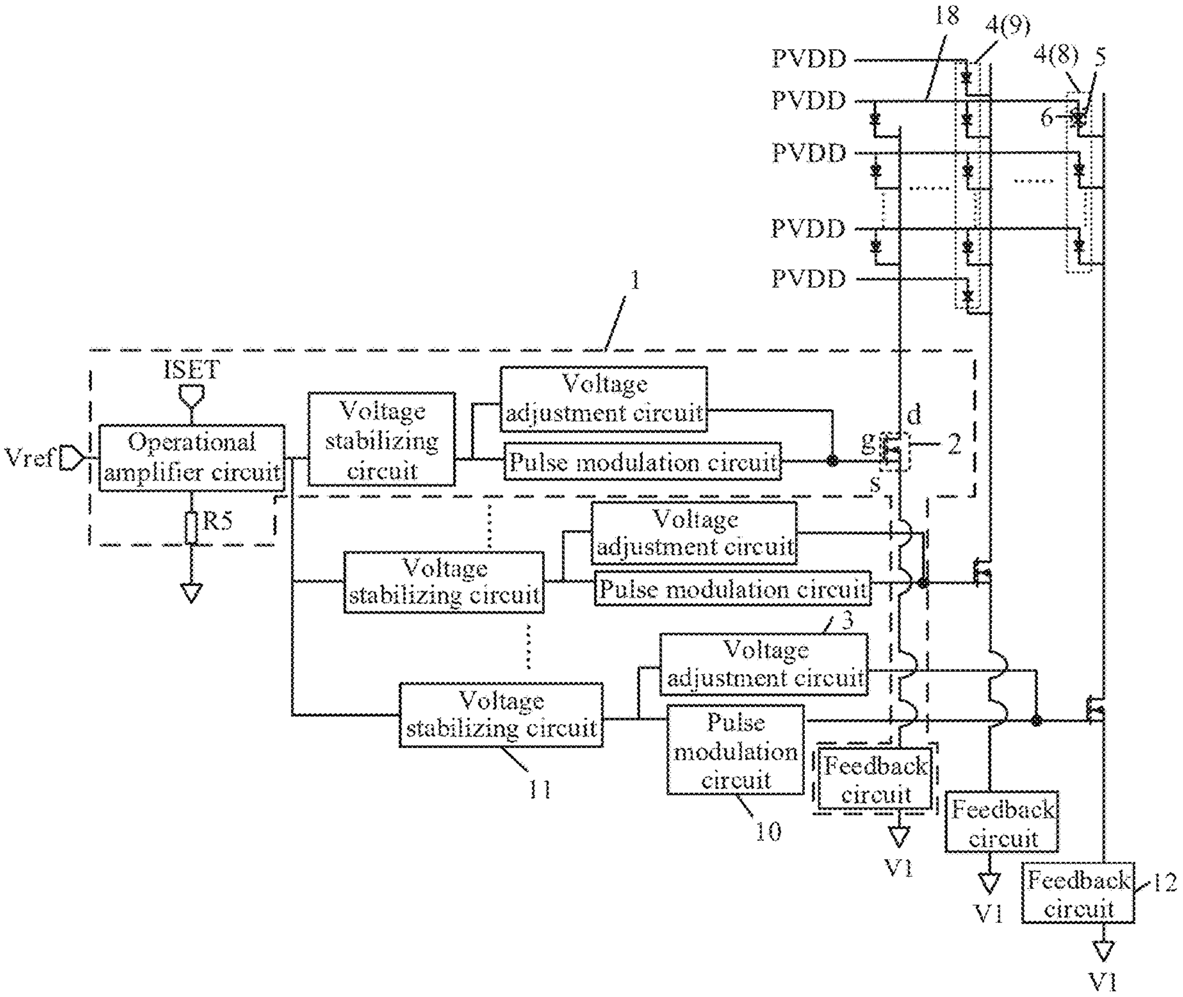
FIG. 11 is another schematic diagram of a structure of a backlight module provided by an embodiment of the present disclosure.

In some embodiments, as shown in FIG. 11, when the driving circuit 1 (i.e., the first driving circuit) includes an operational amplifier circuit and the fifth resistor R5, multiple driving circuits 1 (i.e., the first driving circuits) can share the operational amplifier circuit and the fifth resistor R5.

In some embodiments, as shown in FIG. 11, a plurality of second light-emitting device groups 9 are respectively coupled to different driving circuits 1 (i.e., first driving circuits).

That is, in the backlight module provided by the embodiments of the present disclosure, each light-emitting device group is coupled to the above-mentioned driving circuit provided by the embodiments of the present disclosure in one-to-one correspondence. This can simplify the design difficulty and production difficulty of the backlight module.

Figure 12:
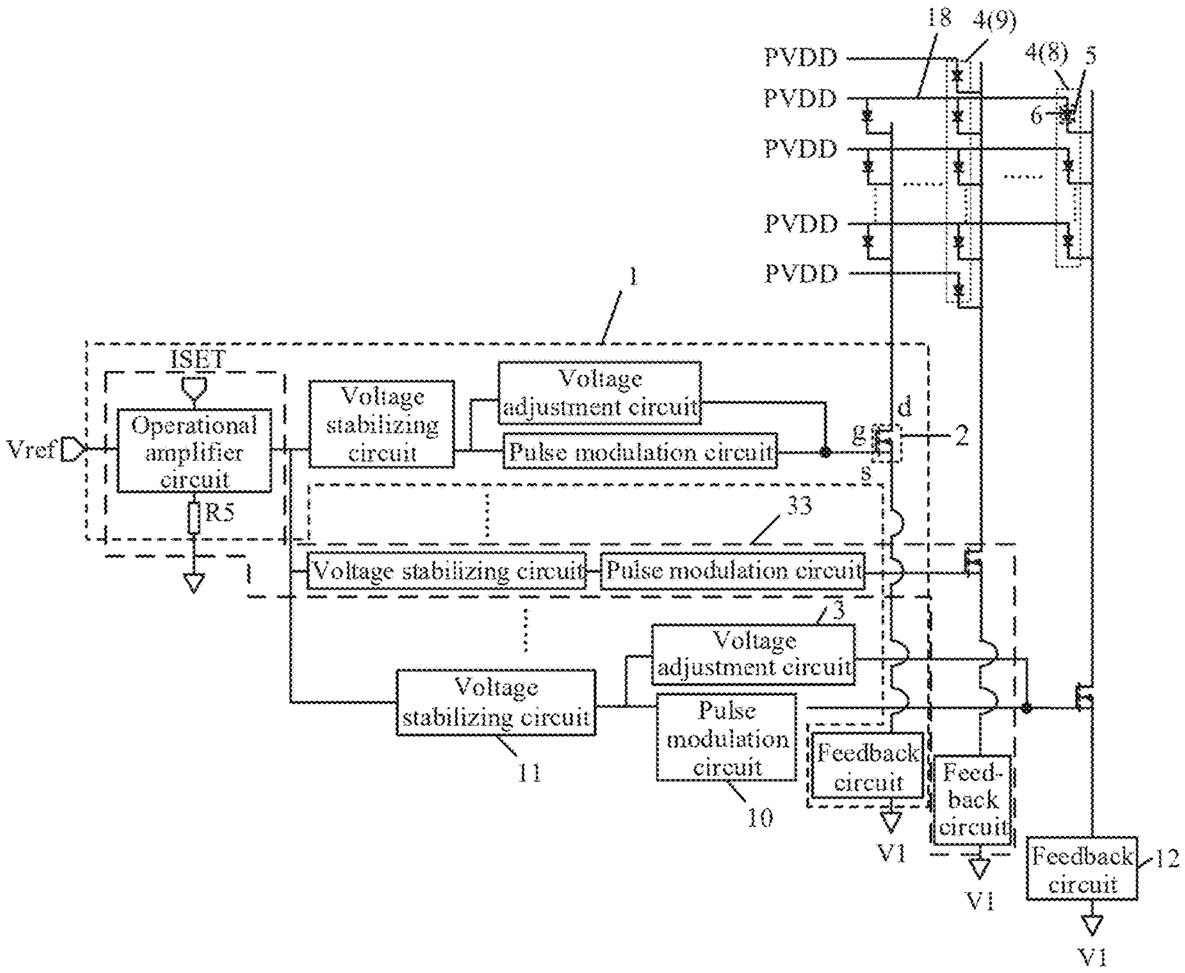
FIG. 12 is another schematic diagram of a structure of a backlight module provided by an embodiment of the present disclosure.

Of course, during specific implementation, the driving circuits connected to the plurality of second light-emitting device groups may not be coupled to the driving circuits provided in the embodiments of the present disclosure. In some embodiments, as shown in FIG. 12, the backlight module further includes a plurality of second driving circuits 33. Among the plurality of light-emitting device groups, only the first light-emitting device group is coupled to the first driving circuit, and the second light-emitting device group is coupled to the second driving circuit. As shown in FIG. 12, the second driving circuit 33 includes, for example: a driving transistor 2, a pulse modulation circuit 10, a voltage stabilizing circuit 11, a feedback circuit 12, an operational amplifier circuit, and a fifth resistor R5. The connection relationships of a drive transistor, a pulse modulation circuit, a voltage stabilizing circuit, a feedback circuit, an operational amplifier circuit, and a fifth resistor included in the second driving circuit are the same as those of the above circuits in the first driving circuit. The specific compositions of the pulse modulation circuit, the voltage stabilizing circuit, the feedback circuit, and the operational amplifier circuit included in the second driving circuit are the same as those of the above-mentioned circuits in the first driving circuit, and will not be described again here. As shown in FIG. 12, when the driving circuit 1 (i.e., the first driving circuit) and the second driving circuit 33 both include an operational amplifier circuit and a fifth resistor R5, a plurality of driving circuits 1 (i.e., the first driving circuits) and a plurality of second driving circuits 33 may share the operational amplifier circuit and the fifth resistor R5.

In specific implementation, as shown in FIGS. 10 and 11, the drain of the driving transistor is coupled to the cathode of the light-emitting device, the anode of the light-emitting device is coupled to the anode voltage signal terminal PVDD, and the anode voltage signal terminal PVDD provides an anode voltage signal to the anode of the light-emitting device. In specific implementation, the light-emitting areas 5 are arranged in an array along the first direction Y and the second direction X. The first direction Y intersects the second direction X. FIGS. 10-11 are illustrated by an example in which the first direction Y is perpendicular to the second direction X. The anodes of the light-emitting devices in a row of light-emitting areas 5 arranged along the second direction X are coupled to the same anode signal line 18. Specifically, the anode signal line can also be coupled to the anode voltage signal terminal PVDD through a data selector (multiplexer, MUX), that is, the MUX is used to control whether the anode voltage signal is input to a row of light-emitting areas. The quantity of multiplexers (MUX) is the same as the preset quantity of light-emitting areas. For example, in FIG. 10 and FIG. 11, each light-emitting area 5 includes one light-emitting device 6. In specific implementation, each light-emitting area may further include a plurality of light-emitting devices arranged along the first direction Y.

During specific implementation, the backlight module provided by the embodiments of the present disclosure can be driven to realize two lighting modes, one is the always-on mode and the other is the black-frame insertion mode. The always-on mode means that the light-emitting devices in each light-emitting device group are always on. The black-frame insertion mode is controlled by timing. Taking a row of light-emitting areas being coupled to one MUX as an example, only one MUX is turned on at a time moment. The light-emitting devices in the row of light-emitting areas corresponding to the turned-on MUX light up, and the cycle repeats itself. The full backlight is displayed by the human vision persistence effect, which can realize low power consumption display.

In some embodiments, the light-emitting device is a micro-sized inorganic light-emitting diode. The micro-sized inorganic light-emitting diode may be, for example, a mini light emitting diode (Mini-LED) or a micro light emitting diode (Micro-LED).

Figure 13:
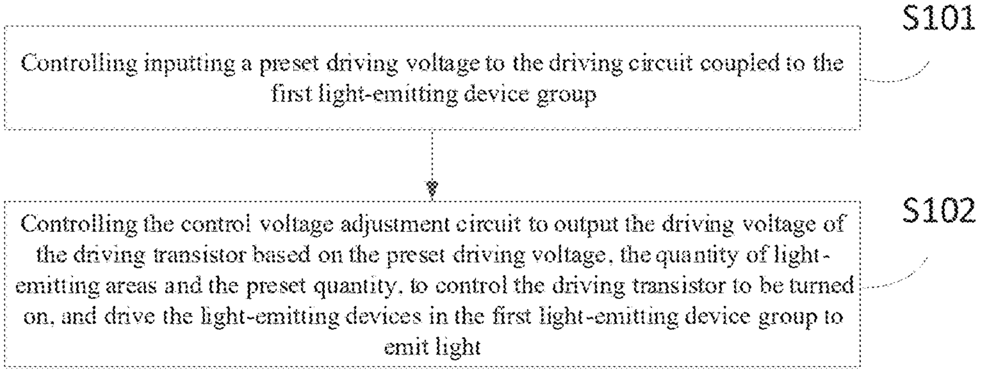
FIG. 13 is a schematic flowchart of a driving method for a backlight module provided by an embodiment of the present disclosure.

A driving method for a backlight module provided by an embodiment of the present disclosure, as shown in FIG. 13, includes:

S101. controlling inputting a preset driving voltage to the driving circuit coupled to the first light-emitting device group; and S102. controlling the control voltage adjustment circuit to output the driving voltage of the driving transistor based on the preset driving voltage, the quantity of light-emitting areas and the preset quantity, to control the driving transistor to be turned on, and drive the light-emitting devices in the first light-emitting device group to emit light.

Embodiments of the present disclosure provide a driving method for a backlight module, a voltage adjustment circuit is used for adjusting the input preset driving voltage according to the quantity of light-emitting areas in the first light-emitting device group and the preset quantity, so that the driving voltage Vgs' of the driving transistor output by the voltage adjustment circuit is not equal to the preset driving voltage Vgs, and the total driving current of the first light-emitting device group is not equal to the total driving current corresponding to the preset driving voltage Vgs. Compared with the situation where the preset driving voltage Vgs is used for controlling the driving transistor to be turned on to drive the first light-emitting device group to emit light, the luminous brightness of each light-emitting device in the first light-emitting device group can be increased or reduced, to avoid a large difference in the brightness of the light-emitting devices in the first light-emitting device group and the second light-emitting device group, and avoid affecting the brightness uniformity of the backlight module.

In some embodiments, the voltage adjustment circuit includes a first pulse modulation switch. While controlling inputting a preset driving voltage to the driving circuit coupled to the first light-emitting device group, the method further includes:

controlling the first pulse modulation switch to be turned on, and providing the preset driving voltage to the first input terminal of the voltage adjustment circuit through the first pulse modulation switch.

In some embodiments, the driving circuit further includes a second pulse modulation switch and a third pulse modulation switch. While controlling the first pulse modulation switch to be turned on, the method further includes:

controlling the second pulse modulation switch and the third pulse modulation switch to be turned off.

In some embodiments, the plurality of second light-emitting device groups are respectively coupled to different driving circuits. The method further includes:

controlling the first pulse modulation switch of the driving circuit coupled to the first light-emitting device group to be turned off, controlling the second pulse modulation switch to be turned on, controlling the driving transistor to be turned on, and driving the light-emitting devices in the second light-emitting device group to emit light.

In some embodiments, the method further includes:

controlling the first pulse modulation switch to be turned off, and controlling the second pulse modulation switch and the third pulse modulation switch to be turned on.

In some embodiments, while controlling the driving transistor to be turned on to drive the light-emitting devices in the first light-emitting device group to emit light, or while controlling the driving transistor to be turned on to drive the light-emitting devices in the second light-emitting device group to emit light, the method further includes:

providing the anode voltage signal to the anode of the light-emitting device through the anode voltage signal terminal.

Figure 14:
FIG. 14 is a schematic diagram of a structure of a display apparatus provided by an embodiment of the present disclosure.

Based on the same inventive concept, an embodiment of the present disclosure further provides a display apparatus, as shown in FIG. 14, including:

the backlight module 13 provided by the embodiments of the present disclosure; and a display panel 14 on a light-emitting side of the backlight module 13.

Figure 15:
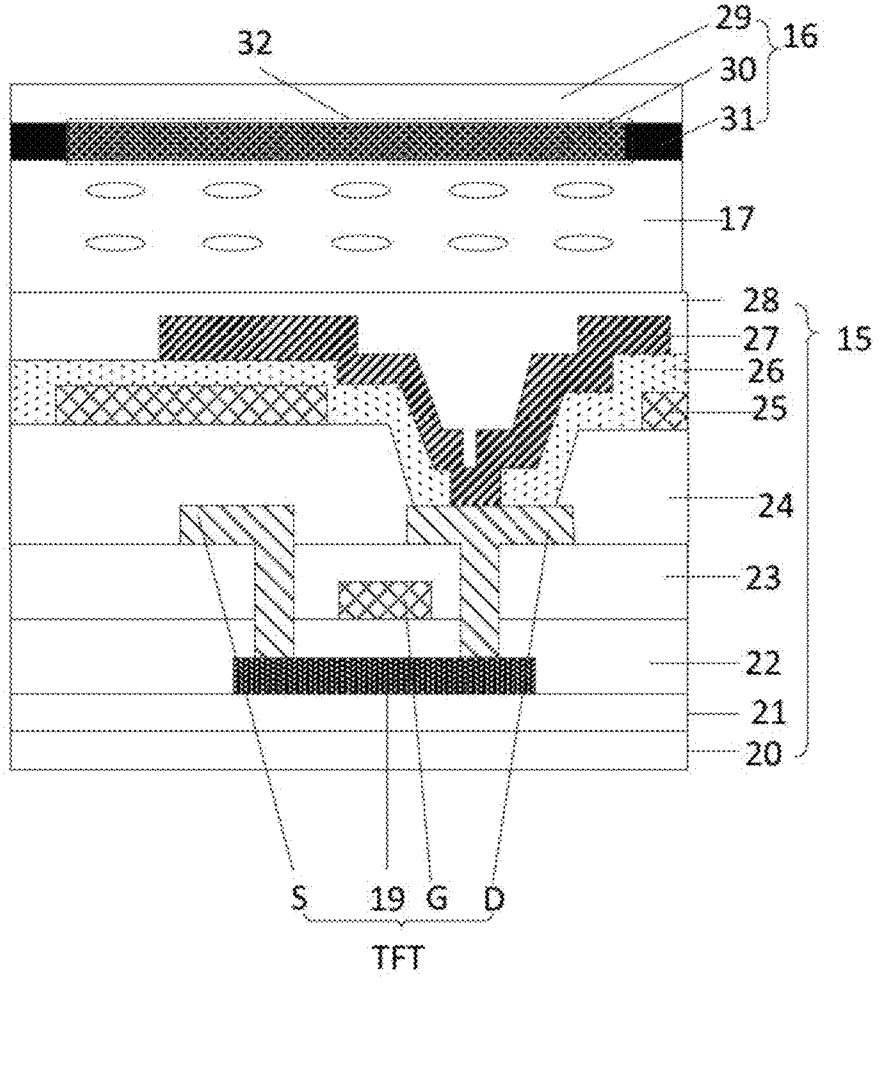
FIG. 15 is another schematic diagram of a structure of a display apparatus provided by an embodiment of the present disclosure.

In some embodiments, the display panel is a liquid crystal display panel. As shown in FIG. 15, the liquid crystal display panel includes: an array substrate 15 and an opposing substrate 16 arranged opposite each other, and a liquid crystal layer 17 between the array substrate 15 and the opposing substrate 16.

In some embodiments, as shown in FIG. 15, the array substrate 15 includes a first substrate 20; and a buffer layer 21, an active layer 19 of a thin film transistor TFT, a gate insulation layer 22, a gate G of the thin film transistor TFT, an interlayer insulation layer 23, a source S and a drain D of the thin film transistor TFT, a planarization layer 24, a common electrode 25, a passivation layer 26, a pixel electrode 27 and a protective layer 28, which are sequentially disposed on a side, facing the liquid crystal layer 17, of the first substrate 20. The opposing substrate 16 includes: a second substrate 29; and colored color resists 30 and a black matrix 31 which are located on a side, facing the liquid crystal layer 17, of the second substrate 29. The black matrix 31 includes a plurality of opening areas 32, and the colored color resistors 30 are located in the opening areas 32.

The display apparatus provided by the embodiments of the present disclosure is: a mobile phone, a tablet computer, a television, a monitor, a notebook computer, a digital photo frame, a navigator, or any other product or component with a display function. Other essential components of the display apparatus should be understood by those of ordinary skill in the art, and will not be described in detail here, nor should they be used to limit the present disclosure. For the implementation of the display apparatus, reference can be made to the above-mentioned embodiments of the driving circuit and the backlight module, and repeated details will not be described again.

In summary, embodiments of the present disclosure provide a driving circuit, a backlight module and a driving method thereof, and a display apparatus. The driving circuit includes a voltage adjustment circuit. The voltage adjustment circuit can adjust the input preset driving voltage based on the quantity of the light-emitting areas in the light-emitting device group coupled to the driving circuit and the preset quantity, so that the driving voltage Vgs' of the driving transistor output by the voltage adjustment circuit is not equal to the preset driving voltage Vgs. Correspondingly, the total driving current of the light-emitting device group is not equal to the total driving current corresponding to the preset driving voltage Vgs. Compared with the situation where the preset driving voltage Vgs is used for controlling the driving transistor to be turned on to drive the light-emitting device group to emit light, the luminous brightness of each light-emitting device in the light-emitting device group can be increased or decreased, which avoids a large difference in brightness of different areas of the backlight module, and avoids affecting the brightness uniformity of the backlight module.

Although the preferred embodiments of the present disclosure have been described, those skilled in the art will be able to make additional changes and modifications to these embodiments once the basic inventive concepts are apparent. Therefore, it is intended that the appended claims be construed to include the preferred embodiments and all changes and modifications that fall within the scope of the disclosure.

Obviously, those skilled in the art can make various changes and modifications to the embodiments of the present disclosure without departing from the spirit and scope of the embodiments of the present disclosure. In this way, if these modifications and variations of the embodiments of the present disclosure fall within the scope of the claims of the present disclosure and equivalent technologies, the present disclosure is also intended to include these modifications and variations.

What is claimed is:

1. A driving circuit, comprising: a driving transistor and a voltage adjustment circuit;

wherein a source of the driving transistor is coupled to a first voltage signal terminal, a drain of the driving transistor is coupled to a light-emitting device group, and a gate of the driving transistor is coupled to an output terminal of the voltage adjustment circuit;

wherein the light-emitting device group comprises a plurality of light-emitting areas arranged along a first direction, and each of the plurality of light-emitting areas comprises at least one light-emitting device;

a quantity of the light-emitting areas in the light-emitting device group is less than or equal to or greater than a preset quantity;

a first input terminal of the voltage adjustment circuit is coupled to a second voltage signal terminal;

a voltage of the second voltage signal terminal is a preset driving voltage Vgs of the driving transistor; and the voltage adjustment circuit is configured to: in response to the quantity of the light-emitting areas in the light-emitting device group not being equal to the preset quantity, output a driving voltage Vgs' of the driving transistor; wherein Vgs' is not equal to Vgs;

wherein the driving circuit further comprises a pulse modulation circuit connected in parallel with the first input terminal and the output terminal of the voltage adjustment circuit;

wherein the pulse modulation circuit comprises: a second pulse modulation switch and a third pulse modulation switch;

a first terminal of the second pulse modulation switch is coupled to the second voltage signal terminal, and a second terminal of the second pulse modulation switch is coupled to a first terminal of the third pulse modulation switch and the gate of the driving transistor; and a second terminal of the third pulse modulation switch is grounded.

2. The driving circuit according to claim 1, wherein the driving voltage Vgs' of the driving transistor and the preset driving voltage Vgs satisfy:

$$Vgs' = \sqrt{\frac{m}{n}}(Vgs - Vth) + Vth;$$

wherein m is the quantity of the light-emitting areas in the light-emitting device group, n is the preset quantity, and Vth is a threshold voltage of the driving transistor.

3. The driving circuit according to claim 2, wherein the voltage adjustment circuit comprises a first operational amplifier and a second operational amplifier;

a non-inverting input terminal of the first operational amplifier is coupled to the second voltage signal terminal;

an inverting input terminal of the first operational amplifier is coupled to a positive electrode of a fixed voltage source, an inverting input terminal of the second operational amplifier and an output terminal of the second operational amplifier;

an output terminal of the first operational amplifier is coupled to the inverting input terminal of the second operational amplifier;

a negative electrode of the fixed voltage source is grounded, and a voltage of the fixed voltage source is the threshold voltage Vth of the driving transistor;

a gain of the first operational amplifier is $$\sqrt{\frac{m}{n}};$$

and a non-inverting input terminal of the second operational amplifier is grounded, and the output terminal of the second operational amplifier is coupled to the gate of the driving transistor.

4. The driving circuit according to claim 3, wherein the voltage adjustment circuit further comprises: a first resistor, a second resistor, a third resistor and a fourth resistor;

a first terminal of the first resistor is coupled to the output terminal of the first operational amplifier, and a second terminal of the first resistor is coupled to the inverting input terminal of the second operational amplifier;

a first terminal of the second resistor is coupled to the inverting input terminal of the first operational amplifier, and a second terminal of the second resistor is coupled to the inverting input terminal of the second operational amplifier;

a first terminal of the third resistor is coupled to the output terminal of the second operational amplifier, and a second terminal of the third resistor is coupled to the inverting input terminal of the second operational amplifier;

a first terminal of the fourth resistor is grounded, and a second terminal of the fourth resistor is coupled to the non-inverting input terminal of the second operational amplifier; and resistance values of the first resistor, the second resistor, the third resistor and the fourth resistor are all same.

5. The driving circuit according to claim 4, wherein the voltage adjustment circuit further comprises a filter capacitor; and a first electrode of the filter capacitor is coupled to the positive electrode of the fixed voltage source and the first terminal of the second resistor, and a second electrode of the filter capacitor is grounded.

6. The driving circuit according to claim 3, wherein the voltage adjustment circuit further comprises a first pulse modulation switch; and a first terminal of the first pulse modulation switch is coupled to the second voltage signal terminal, and a second terminal of the first pulse modulation switch is coupled to the non-inverting input terminal of the first operational amplifier.

7. The driving circuit according to claim 1, further comprising: a voltage stabilizing circuit;

wherein the voltage stabilizing circuit comprises a third operational amplifier and a fourth operational amplifier;

a non-inverting input terminal of the third operational amplifier is coupled to the second voltage signal terminal, an inverting input terminal of the third operational amplifier is coupled to the source of the driving transistor, and an output terminal of the third operational amplifier is coupled to a non-inverting input terminal of the fourth operational amplifier; and an inverting input terminal of the fourth operational amplifier is coupled to an output terminal of the fourth operational amplifier, and the output terminal of the fourth operational amplifier is coupled to the first input terminal of the voltage adjustment circuit.

8. The driving circuit according to claim 7, further comprising: an operational amplifier circuit and a fifth resistor;

wherein a first input terminal of the operational amplifier circuit is coupled to the second voltage signal terminal, a second input terminal of the operational amplifier circuit is coupled to a current magnification adjustment signal terminal, a third input terminal of the operational amplifier circuit is coupled to a first terminal of the fifth resistor, and an output terminal of the operational amplifier circuit is coupled to the non-inverting input terminal of the third operational amplifier; and a second terminal of the fifth resistor is grounded.

9. The driving circuit according to claim 1, further comprising a feedback circuit;

wherein the feedback circuit comprises a feedback resistor;

a first terminal of the feedback resistor is coupled to the source of the driving transistor, and a second terminal of the feedback resistor is coupled to the first voltage signal terminal; and the first voltage signal terminal is a ground potential signal terminal.

10. The driving circuit according to claim 1, wherein the driving transistor is an N-type metal-oxide-semiconductor field-effect transistor.

11. A backlight module, comprising: a plurality of light-emitting device groups, and a plurality of first driving circuits; wherein the first driving circuit is the driving circuit according to claim 1;

each of the plurality of light-emitting device groups comprises a plurality of light-emitting areas arranged along the first direction, and each of the plurality of light-emitting areas comprises at least one light-emitting device;

the plurality of light-emitting device groups comprise a plurality of first light-emitting device groups and a plurality of second light-emitting device groups; a quantity of light-emitting areas in each of the plurality of second light-emitting device groups is equal to the preset quantity, and a quantity of light-emitting areas in each of the plurality of first light-emitting device groups is smaller than the quantity of the light-emitting areas in each second light-emitting device group; and the plurality of first light-emitting device groups are respectively coupled to different first driving circuits.

12. The backlight module according to claim 11, wherein the plurality of second light-emitting device groups are respectively coupled to different first driving circuits.

13. A display apparatus, comprising:

the backlight module according to claim 12; and the display panel on a light-emitting side of the backlight module.

14. The backlight module according to claim 11, further comprising a plurality of second driving circuits;

wherein the plurality of second light-emitting device groups are respectively coupled to different second driving circuits; and each of the second driving circuits comprises: a driving transistor, a pulse modulation circuit, a voltage stabilizing circuit, a feedback circuit, an operational amplifier circuit and a fifth resistor.

15. A driving method for the backlight module according to claim 11, comprising:

controlling inputting the preset driving voltage to the driving circuit coupled to the first light-emitting device group; and controlling the voltage adjustment circuit to output the driving voltage of the driving transistor based on the preset driving voltage, the quantity of the light-emitting areas and the preset quantity, to control the driving transistor to be turned on, and drive light-emitting devices in the first light-emitting device group to emit light.

16. The method according to claim 15, wherein the voltage adjustment circuit comprises a first pulse modulation switch;

wherein while controlling inputting the preset driving voltage to the driving circuit coupled to the first light-emitting device group, the method further comprises:

controlling the first pulse modulation switch to be turned on, and providing the preset driving voltage to the first input terminal of the voltage adjustment circuit through the first pulse modulation switch.

17. The method according to claim 16, wherein the driving circuit further comprises a second pulse modulation switch and a third pulse modulation switch;

wherein while controlling the first pulse modulation switch to be turned on, the method further comprises:

controlling the second pulse modulation switch and the third pulse modulation switch to be turned off;

wherein the plurality of second light-emitting device groups are respectively coupled to different driving circuits;

wherein the method further comprises:

controlling the first pulse modulation switch of the driving circuit coupled to the first light-emitting device group to be turned off, controlling the second pulse modulation switch to be turned on, controlling the driving transistor to be turned on, and driving light-emitting devices in the second light-emitting device group to emit light.

18. The driving circuit according to claim 1, wherein the voltage adjustment circuit is configured to: in response to the quantity of the light-emitting areas in the light-emitting device group not being equal to the preset quantity, output the driving voltage Vgs' of the driving transistor based on the preset driving voltage input, the quantity of the light-emitting areas in the light-emitting device group and the preset quantity.

* * * * *